(12) United States Patent
Meggison et al.

US006920820B2

(10) Patent No.: US 6,920,820 B2
(45) Date of Patent: Jul. 26, 2005

(54) COOKING APPARATUS AND METHODS OF FORMING

(75) Inventors: Jim Meggison, Fort Wayne, IN (US); Kurt Coyne, Butler, IN (US); Stephen J Whiteley, Fort Wayne, IN (US); Dave Furge, Fort Wayne, IN (US); Tim Palmer, Fort Wayne, IN (US); James Eldon Sexton, Fort Wayne, IN (US)

(73) Assignee: Lincoln Foodservice Products Inc., Fort Wayne, IN (US)

( * ) Notice: Subject to any disclaimer, the term of this patent is extended or adjusted under 35 U.S.C. 154(b) by 163 days.

(21) Appl. No.: 10/643,162

(22) Filed: Aug. 18, 2003

(65) Prior Publication Data

US 2005/0039610 A1 Feb. 24, 2005

(51) Int. Cl.[7] .......................... A47S 37/00; A47S 27/00
(52) U.S. Cl. ............................ 99/422; 99/340; 99/403; 220/452; 220/768; 16/DIG. 24; 16/110.1
(58) Field of Search .................. 16/DIG. 24, DIG. 25, 16/425, 110.1, 111.1; 99/422, 340, 403, 449, 425, 410, 646 R; 220/759, 770, 768, 752

(56) References Cited

U.S. PATENT DOCUMENTS

| 2,342,692 A | * | 2/1944 | Rehm .......................... 219/393 |
| 4,195,560 A | * | 4/1980 | DuBois et al. ................. 99/422 |
| 5,507,220 A | * | 4/1996 | Jung ............................ 99/403 |

* cited by examiner

*Primary Examiner*—Reginald L. Alexander
(74) *Attorney, Agent, or Firm*—Ohlandt, Greeley, Ruggiero & Perle, L.L.P.

(57) ABSTRACT

A cooking apparatus and methods of forming are provided. The cooking apparatus has a cooking surface, a sidewall depending from the cooking surface, and a handle is provided. The handle has a saddle portion and a gripping portion. The saddle portion includes a first opening defined therethrough and a first recess defined about the first opening. The saddle portion is adjacent the sidewall so that the first recess defines a first gap between the sidewall and the saddle portion. A first rivet secures the handle to the sidewall. The rivet has a first weldament in the first gap, a first shaft in the first opening, and a first head abutting the handle and covering the first opening.

21 Claims, 2 Drawing Sheets

COOKING APPARATUS AND METHODS OF FORMING

BACKGROUND OF THE INVENTION

The present disclosure is related to a cooking apparatus, such as a pot, a pan, a wok, and the like. More particularly, the present disclosure is related to a cooking apparatus and methods of forming.

Cooking apparatus or cookware typically includes a cooking surface, a depending sidewall, and a handle attached to the sidewall. The cooking surface and wall are adapted to receive the food to be cooked. Heat can be conducted through the cooking surface from a heat source, such as a stove or oven, to cook the food thereon. The handle allows the user to move the cookware as desired, often times while the cooking surface is at an elevated temperature.

Accordingly, it has traditionally been desired to insulate and/or isolate the handle from heat conducted into the cooking surface and/or wall. For example, one solution has been to provide the cooking surface and wall of a highly conductive metal such as aluminum or aluminum alloys, with a handle of a different, lower conductive metal such as steel or iron. In this manner, heat conducted into the cooking surface quickly and evenly spreads across the cooking surface to evenly cook food thereon. However, the conduction of heat into the handle is slowed by the lower conductivity of the handle.

The handle and sidewall made of dissimilar metals has presented challenges in connecting the handle to the sidewall in an easy to clean, inexpensive, secure manner. For example, directly welding dissimilar metals to one another, namely the steel handle to the aluminum wall, is not possible. Thus, it has been necessary to secure or attach the handle to the wall with mechanical means, such as rivets, bolts, and the like. This solution has proven effective at maintaining a tight attachment between the wall and the handle. However, this solution requires a portion of the rivets or bolts to protrude through the wall into the cooking area, which can form areas that trap food particles and/or are difficult to clean.

Accordingly, there is a continuing need for cookware handle attachments and methods of forming that resolve or mitigate one or more of the aforementioned and other defects and deficiencies of the prior art.

SUMMARY OF THE INVENTION

A cooking apparatus having a cooking surface, a sidewall depending from the cooking surface, and a handle is provided. The handle has a saddle portion and a gripping portion. The saddle portion includes a first opening defined therethrough and a first recess defined about the first opening. The saddle portion is adjacent the sidewall so that the first recess defines a first gap between the sidewall and the saddle portion. A first rivet secures the handle to the sidewall. The rivet has a first weldment in the first gap, a first shaft in the first opening, and a first head abutting the handle and covering the first opening.

A method of forming a cooking apparatus is also provided. The method includes positioning a handle with respect to a cooking surface wall so that a saddle portion of the handle is adjacent the cooking surface wall; inserting a first rivet into a first opening defined in the saddle portion so that a first shaft of the first rivet contacts the cooking surface wall, the first rivet being formed of a third material weldable to the first material; inducing a current through the first rivet and the cooking surface wall so as to weld the first shaft and the cooking surface wall to one another and so that a first portion of the first shaft expands into a first gap defined between the cooking surface wall and the saddle portion at the first opening; and deforming the first rivet to abut a first head of the first rivet with the saddle portion and to cover the first opening.

The above-described and other features and advantages of the present disclosure will be appreciated and understood by those skilled in the art from the following detailed description, drawings, and appended claims.

DETAILED DESCRIPTION OF THE INVENTION

Figure 1:
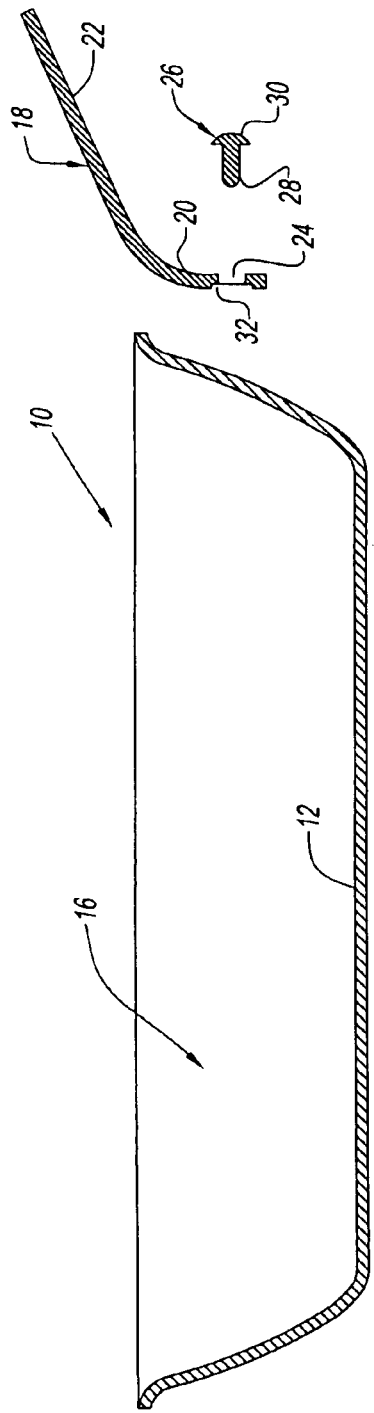
FIG. 1 is an exploded sectional view of a piece cookware according to an exemplary embodiment of the present disclosure.
Figure 2:
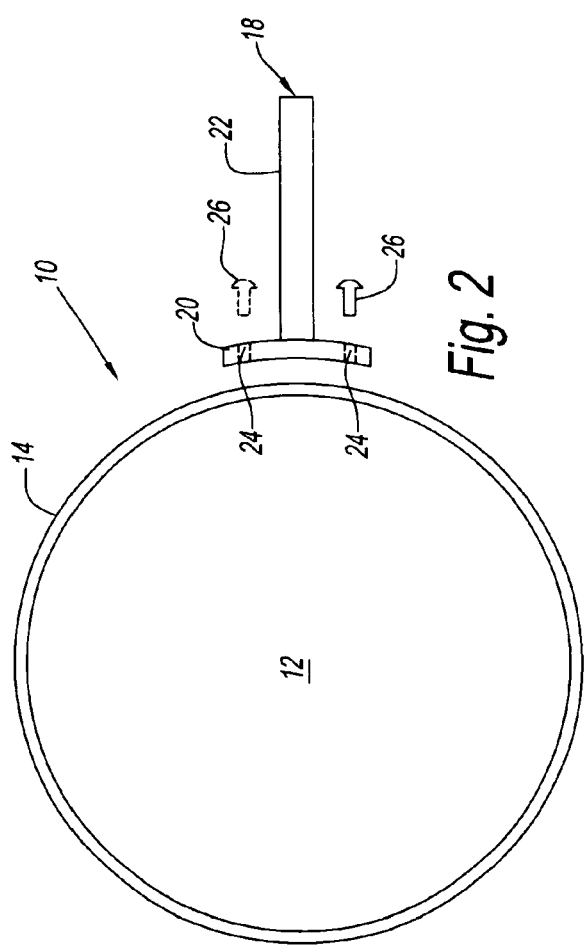
FIG. 2 is an exploded top view of the cookware of FIG. 1.

Referring to the drawings and in particular to FIGS. 1 and 2, a cooking apparatus or cookware 10 according to an exemplary embodiment of the present disclosure is illustrated in an exploded sectional view. Cookware 10 includes a cooking surface 12 and a sidewall 14. Surface 12 and sidewall 14 define a cooking area 16 of cookware 10. Cooking area 16 can include a non-stick coating (not shown), such as, but not limited to TEFLON, disposed thereon.

Cookware 10 is illustrated having a circular or curved shape when viewed from above (FIG. 2) and having a curved sidewall when viewed from the side (FIG. 1). Of course, it is contemplated by the present disclosure for cookware 10 to have any desired shape when viewed from above such as a circular shape, a polygonal shape, and combinations thereof. In addition, it is also contemplated by the present disclosure for cookware 10 to have sidewall 14 with any desired shape when viewed from the side such as a curved, linear, and combinations thereof.

Cooking surface 12 is formed from a first material. The first material is, preferably, a highly heat conductive material. For example, the first material can be aluminum, aluminum alloy, copper, or other conductive materials. Sidewall 14 depends upwardly from cooking surface 12 and is also formed of the first material. In an exemplary embodiment, sidewall 14 is integrally formed as a one piece or unitary element with cooking surface 12. It should be recognized that cooking surface 12 and sidewall 14 are illustrated by way of example as being integrally formed of the same material. Of course, it is contemplated by the present disclosure for cooking surface 12 and sidewall 14 to be made of different materials and/or to be non-integrally formed.

Cookware 10 includes a handle 18 formed from a second material. The second material is, preferably, a low heat conductive material. For example, the second material can be steel, iron, steel alloy, or other poor heat conducting materials. In a preferred embodiment, handle 18 is formed of zinc coated steel.

Figure 3:
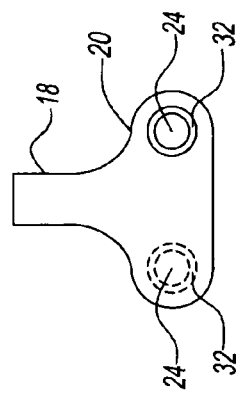
FIG. 3 is an end view of an exemplary embodiment of a handle for the cookware of FIG. 1.

Handle 18 has a saddle portion 20 and a gripping portion 22. Saddle portion 20 is configured to be secured against sidewall 14. Specifically, saddle portion 20 has an opening 24 defined therethrough for receiving a rivet 26. Rivet 26 has a shaft 28 and a head 30. Rivet 26 and is formed of a third material that can be welded to the first material of sidewall 14. For example, the third material of rivet 26 can be the same as the first material of sidewall 14. In addition, saddle portion 20 has a recessed area 32 defined about opening 24 at an inner side of the saddle portion as illustrated in FIG. 3.

It should be recognized that cookware 10 is illustrated for purposes of clarity having one rivet 26 and one opening 24. Of course, it is contemplated by the present disclosure for cookware 10 to have two or more rivets 26 and openings 24. For example, it is contemplated for cookware 10 to have two rivets 26 for receipt in two openings 24 positioned horizontally with respect to one another as illustrated in phantom in FIGS. 2 and 3. Alternately, it is contemplated for cookware 10 to have two or more rivets and openings that are positioned vertically with respect to one another or for the openings. In addition, it should be recognized that opening 24 and rivet 26 are illustrated for purposes of clarity having a circular cross section. Of course, it is contemplated by the present disclosure for the opening 24 and/or rivet 26 of cookware 10 to have a non-circular cross section. In addition, it is contemplated by the present disclosure for cookware 10 to have more than two openings 24 and rivets 26.

Figure 4:
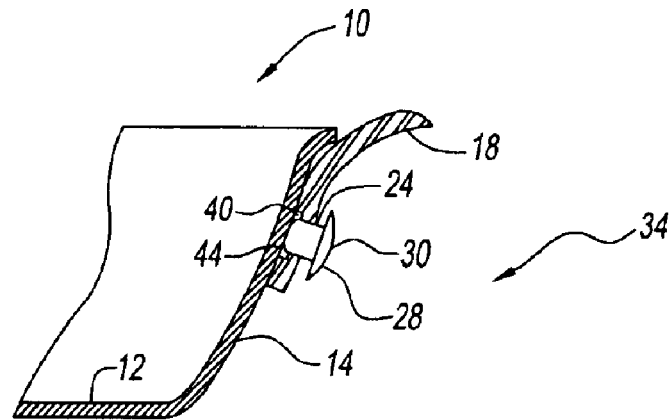
FIG. 4 is a sectional view of the cookware of FIG. 1 in a first assembled state.
Figure 5:
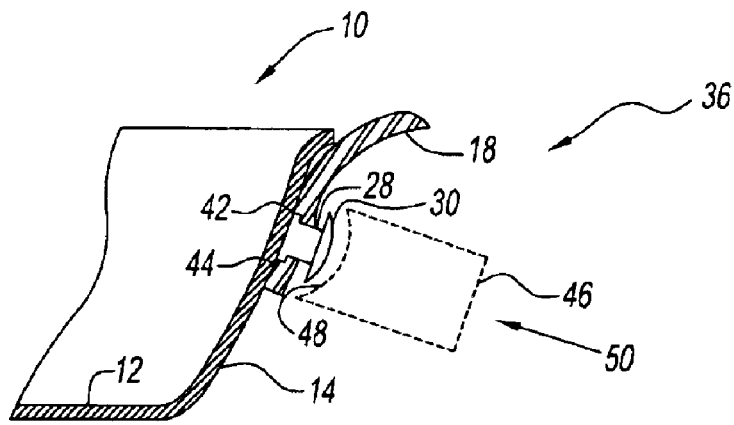
FIG. 5 is a section view of the cookware of FIG. 1 in a second assembled state.
Figure 6:
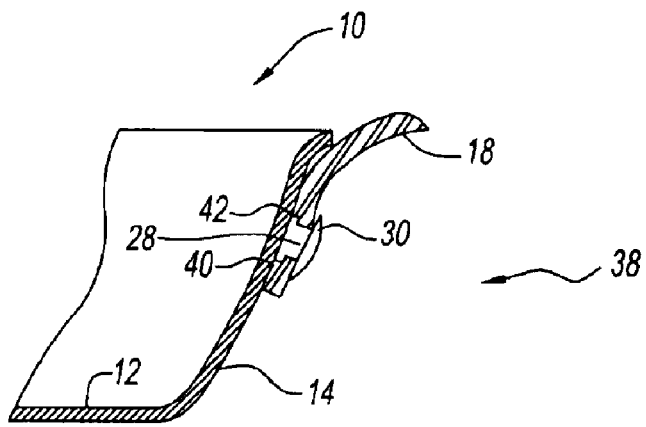
FIG. 6 is a section view of the cookware of FIG. 1 in a third assembled state.

Cookware 10 is illustrated in various stages of assembly in FIGS. 4 through 6. Specifically, cookware 10 is illustrated in a first assembled state 34 in FIG. 4, in a second assembled state 36 in FIG. 5, and in a third assembled state 36 in FIG. 6.

In first assembled state 34, handle 18 is positioned in a selected location with respect to sidewall 14. Here, saddle portion 20 is in contact with sidewall 14 so that recessed area 32 defines a gap 40 between the handle and the sidewall. Rivet 26 is disposed through opening 24 in handle 18 so that shaft 28 is in contact with sidewall 14. In the illustrated embodiment, shaft 28 has a length sufficient to ensure head 30 does not contact handle 18 in this first assembled state 34.

In second assembled state 36, shaft 28 of rivet 26 is welded to sidewall 14. For example, rivet 26 can be electrically resistive welded to sidewall 14 using known midfrequency direct current (MFDC) resistive welding practices. During welding of rivet 26, an electrical current is induced in rivet 26 and sidewall 14 to cause the rivet and sidewall to melt and, thus, weld to one another. In addition, gap 40 allows a portion or weldament 42 of the molten rivet to expand and fill substantially all of the gap. It has also been determined that gap 40 mitigates expansion of molten rivet back through opening 24 (e.g., flashback) and impinging on head 30. It is believed that gap 40 provides an area of expansion for weldament 42, which mitigates flashback.

In some embodiments, rivet 26 can include a beveled end 44 opposite head 30. Beveled end 44 has a diameter that is smaller than the diameter of shaft 28. It has been found that beveled end 44 can also mitigate instances of flashback. It is believed that bevel end 44 also provides an area of expansion for weldament 42, which mitigates flashback. Advantageously, the reduction in diameter of shaft 28 (i.e., beveled end 44) reduces the amount of surface contact between sidewall 14 and rivet 26. It has been determined that the decrease in surface contact provided by beveled end 44 also reduces that amount of current necessary to form weldament 42. For example, in one exemplary embodiment shaft 28 has a diameter of about 0.281 inches, while beveled end 44 has a diameter of about 0.187 inches. Rivet 26 having beveled end 44 requires about 5% less current than a similarly sized rivet lacking the beveled end.

Accordingly, it has also been determined that gap 40 and/or end 42 mitigates flashback. Thus, cookware 10 has a larger weld area than would be possible without the gap and/or beveled end 44, while weldament 42 seals the gap to reduce instances of food particles being harbored therein, at a lower cost than previously possible.

In third assembled state 38, rivet 26 is deformed or coined to eliminate any space or gap between head 30 and handle 18. For example, head 30 abuts handle 18 after coining. This ensures a tight fit between handle 18 and sidewall 14. In addition, the coined head 30 completely covers openings 24 in handle 18 to mitigate food particles for becoming trapped in the opening.

It has been found that welding rivets 26 onto sidewall 14 as described above, namely after placement of handle 18 adjacent to the sidewall, also mitigates many of the problems and costs associated with prior systems having pre-welded studs. Specifically, it has been found that the method of the present disclosure mitigates the costs and problems encountered when studs are welded on the sidewall before the handle is placed into position.

For example, prior pre-welded systems required either the opening in the handle to be slotted or oversized and/or required tighter manufacturing tolerances in the cookware. The interaction of the location of the pre-welded stud, the shape of the sidewall, the shape of the handle's saddle, and the location of the opening in the saddle require either very costly manufacturing controls to ensure that the pre-welded stud fits into the opening. Alternately, the interaction of these variables requires that the opening be oversized to accommodate tolerances in one or more of these variables.

In one prior solution for circular cookware, the shafts of the pre-welded studs were formed along the radius of the cookware. In order for the openings in the handle to fit over such radial studs, the openings were slotted or oversized. However, the oversized openings have proven too large to be completely covered by coining the stud or by the use of a nut, which allowed food particles to be harbored therein. Alternate prior solutions for circular cookware formed the pre-welded studs parallel to the desired axis of the handle, namely not along the radius of the cookware. However, this method has proven to be costly and imprecise. Again, the oversized openings have proven too large to be completely covered by coining the stud or by the use of a nut, while the increased manufacturing tolerances have increased to cost of manufacture.

The placement of the pre-welded stud is made even more difficult in cookware having a curved or non-linear sidewall. The curvature of such a sidewall has also traditionally required the opening in the handle to be slotted or oversized. Again, the oversized openings have proven too large to be completely covered by coining the stud or by the use of a nut.

In contrast, the method of the present disclosure provides opening 24 having a dimension that is equal to or only slightly larger than the diameter rivet 26. For example, opening 24 has a dimension is about 0% to about 20% larger than rivet 26, preferably about 10% to about 17%, with about 12% being most preferred. Thus, the method of the present disclosure not only mitigates the need for the costly increased manufacturing tolerances of prior systems, but also ensures that openings 24 are completely covered by head 30 to reduce areas that could harbor hard to clean food particles. Moreover, the method of the present disclosure allows opening 24 to be sized with respect to rivet 24 irrespective of the whether sidewall 14 is circular and/or curved.

In this manner, cookware 10 has a securely attached handle 18 that is riveted into the selected position without portions of rivet 26 protruding into cooking area 16. In addition, the connection between handle 18 and sidewall 14 mitigates gaps that could trap food particles. Thus, cookware 10 provides both a cooking area that is smooth for easy cleaning and non-harboring of food particles and an easy to clean outer surface. In addition, cookware mitigates the need for costly and time consuming process controls of prior systems.

Referring again to FIG. 5, an alternate embodiment of second assembled state 36 is illustrated in phantom. Here, the MFDC resistive welding process includes a welding contact 46 for inputting electricity into cookware 10 during welding. Contact 46 includes a shaped surface 48 configured to correspond to a desired shape of head 30 after coining. In this embodiment, contact 46 is configured to reciprocate in a direction 50 along the axis of shaft 28 of rivet 26. Thus, contact 46 allows the welding and coining processes to occur substantially simultaneous to one another.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A cooking apparatus comprising:
   a cooking surface;
   a sidewall depending from said cooking surface;
   a handle having a saddle portion and a gripping portion, said saddle portion having a first opening defined therethrough and a first recess defined about said first opening, said saddle portion being adjacent said sidewall so that said first recess defines a first gap between said sidewall and said saddle portion; and
   a first rivet having a first weldament in said first gap, a first shaft in said first opening, and a first head abutting said handle and covering said first opening.

2. The cooking apparatus as in claim 1, wherein said first weldament fills substantially all of said first gap.

3. The cooking apparatus as in claim 1, wherein said first opening has a dimension that is about 0% to about 20% larger than said first shaft.

4. The cooking apparatus as in claim 1, wherein said first rivet has a beveled end opposite said first head.

5. The cooking apparatus as in claim 1, further comprising a second opening defined through said saddle portion, said second opening being offset from said first opening in a first direction, a second direction, or any combination of said first and second directions.

6. The cooking apparatus as in claim 5, further comprising:
   a second recess defined about said second opening, said saddle portion being adjacent said sidewall so that said second recess defines a second gap between said sidewall and said saddle portion; and
   a second rivet having a second weldament in said second gap, a second shaft in said second opening, and a second head abutting said handle and covering said second opening.

7. The cooking apparatus as in claim 6, wherein said second weldament fills substantially all of said second gap.

8. The cooking apparatus as in claim 6, wherein said second opening has a dimension that is about 0% to about 20% larger than said second shaft.

9. The cooking apparatus as in claim 8, wherein said sidewall when viewed from a first plane has a shape selected from the group consisting of circular, polygonal, and any combination thereof.

10. The cooking apparatus as in claim 8, wherein said sidewall when viewed from a second plane has a shape selected from the group consisting of curved, linear, and any combination thereof.

11. The cooking apparatus as in claim 1, wherein said sidewall is formed of a first material and said handle is formed of a second material, said first material being more conductive to heat than said second material.

12. The cooking apparatus as in claim 11, wherein said first rivet is formed of a third material that is weldable to said first material.

13. The cooking apparatus as in claim 11, wherein said cooking surface is formed of said first material.

14. A method of forming a cooking apparatus, comprising:
   positioning a handle with respect to a cooking surface wall so that a saddle portion of said handle is adjacent said cooking surface wall, said cooking surface wall being formed of a first material and said handle being formed of a second material dissimilar to said first material;
   inserting a first rivet into a first opening defined in said saddle portion so that a first shaft of said first rivet contacts said cooking surface wall, said first rivet being formed of a third material weldable to said first material;
   inducing a current through said first rivet and said cooking surface wall so as to weld said first shaft and said cooking surface wall to one another and so that a first portion of said first shaft expands into a first gap defined between said cooking surface wall and said saddle portion at said first opening; and
   deforming said first rivet to abut a first head of said first rivet with said saddle portion and to cover said first opening.

15. The method as in claim 14, wherein inducing said current and deforming said first rivet are substantially simultaneous.

16. The method as in claim 14, wherein said first material is more conductive to heat than said second material.

17. The method as in claim 14, wherein said first opening has a dimension that is about 0% to about 20% larger than said first shaft.

18. The method as in claim 17, wherein said cooking surface wall when viewed from a first plane has a shape selected from the group consisting of circular, polygonal, and any combination thereof.

19. The cooking apparatus as in claim 17, wherein said cooking surface wall when viewed from a second plane has a shape selected from the group consisting of curved, linear, and any combination thereof.

20. The method as in claim 14, wherein said first portion fills substantially all of said first gap.

21. The method as in claim 14, further comprising inserting a second rivet into a second opening defined in said saddle portion so that a second shaft of said second rivet contacts said cooking surface wall, said second rivet being formed of said third material;

inducing said current through second rivet and said cooking surface wall so as to weld said second shaft and said cooking surface wall to one another and so that a second portion of said second shaft expands into a second gap defined between said cooking surface wall and said saddle portion at said second opening; and deforming said second rivet to abut a second head of said second rivet with said saddle portion and to cover said second opening.

\* \* \* \* \*